(12) United States Patent
Cooper

(10) Patent No.: US 9,753,265 B2
(45) Date of Patent: Sep. 5, 2017

(54) VARIABLE ORIENTATION ILLUMINATION-PATTERN ROTATOR

(75) Inventor: Jeremy R. Cooper, Issaquah, WA (US)

(73) Assignee: GE Healthcare Bio-Sciences Corp., Piscataway, NJ (US)

(*) Notice: Subject to any disclaimer, the term of this patent is extended or adjusted under 35 U.S.C. 154(b) by 279 days.

(21) Appl. No.: 14/002,431

(22) PCT Filed: Oct. 31, 2011

(86) PCT No.: PCT/US2011/058500
§ 371 (c)(1),
(2), (4) Date: Aug. 30, 2013

(87) PCT Pub. No.: WO2012/118530
PCT Pub. Date: Sep. 7, 2012

(65) Prior Publication Data
US 2013/0342886 A1    Dec. 26, 2013

Related U.S. Application Data

(60) Provisional application No. 61/447,708, filed on Mar. 1, 2011.

(51) Int. Cl.
*G02B 21/06* (2006.01)
*G02B 21/08* (2006.01)
(Continued)

(52) U.S. Cl.
CPC .......... *G02B 21/06* (2013.01); *G02B 21/082* (2013.01); *G02B 21/16* (2013.01); *G02B 21/367* (2013.01); *G02B 27/58* (2013.01); *G02B 21/0032* (2013.01)

(58) Field of Classification Search
CPC ........ G02B 21/0032; G02B 21/0052–21/0076; G02B 21/06–21/16; G02B 21/0048; G02B 21/0068; G02B 21/0092; G02B 27/58
(Continued)

(56) References Cited

U.S. PATENT DOCUMENTS 4,008,958 A * 2/1977 Kingsland ............... G02B 26/10
355/51
4,060,322 A * 11/1977 Hirayama ............... G06F 3/002
355/60
(Continued)

FOREIGN PATENT DOCUMENTS

DE  WO 2009152867 A1 * 12/2009 .......... G02B 27/642
DE     102008054317 A1    5/2010

OTHER PUBLICATIONS

Meadowlark Optics, "Basic Polarization Techniques and Devices," Meadowlark Optics, Inc., 2005.*

*Primary Examiner* — Thomas K Pham
*Assistant Examiner* — Nicholas R Pasko
(74) *Attorney, Agent, or Firm* — Eversheds Sutherland (US) LLP

(57) ABSTRACT

Variable orientation illumination-pattern rotators ("IPRs") that can be incorporated into structured illumination microscopy instruments to rapidly rotate an interference pattern are disclosed. An IPR includes a rotation selector and at least one mirror cluster. The rotation selector directs beams of light into each one of the mirror clusters for a brief period of time. Each mirror cluster imparts a particular predetermined angle of rotation on the beams. As a result, the beams output from the IPR are rotated through each of the rotation angles imparted by each of the mirror clusters. The rotation selector enables the IPR to rotate the beams through each
(Continued)

predetermined rotation angle on the order of 5 milliseconds or faster.

18 Claims, 11 Drawing Sheets

(51) Int. Cl.
  *G02B 21/16* (2006.01)
  *G02B 21/36* (2006.01)
  *G02B 27/58* (2006.01)
  *G02B 21/00* (2006.01)

(58) Field of Classification Search
  USPC .......... 359/379–381, 385–390, 201.1–204.5, 359/207.9, 216.1
  See application file for complete search history.

(56) References Cited

U.S. PATENT DOCUMENTS

| | | | |
|---|---|---|---|
| 4,478,482 A * | 10/1984 | Koester | G02B 21/0032 359/201.1 |
| 5,621,561 A * | 4/1997 | Belfatto | G02B 26/101 359/201.1 |
| 7,209,287 B2 * | 4/2007 | Lauer | G02B 21/004 250/458.1 |
| 7,391,565 B2 | 6/2008 | Lauer | |
| 7,463,344 B2 * | 12/2008 | Wolleschensky | G02B 21/002 356/72 |
| 7,573,635 B2 * | 8/2009 | Uhl | G02B 21/0048 359/368 |
| 8,016,422 B2 * | 9/2011 | Silverstein | G02B 27/102 353/20 |
| 2005/0006597 A1 | 1/2005 | Wolleschensky et al. | |
| 2009/0109527 A1 | 4/2009 | Sasaki et al. | |
| 2009/0316141 A1 * | 12/2009 | Feldkhun | G01N 21/6458 356/217 |
| 2010/0049055 A1 * | 2/2010 | Freudenberg | A61B 5/0059 600/475 |
| 2010/0284024 A1 | 11/2010 | Vucinic et al. | |
| 2010/0315708 A1 * | 12/2010 | Amberger | G02B 21/06 359/389 |
| 2011/0122391 A1 * | 5/2011 | Totzeck | G02B 27/642 355/71 |
| 2011/0194175 A1 * | 8/2011 | Dougherty | G01N 21/6458 359/386 |
| 2011/0284767 A1 * | 11/2011 | Wolleschensky | G02B 21/367 250/459.1 |
| 2013/0335797 A1 * | 12/2013 | Cooper | G02B 21/16 359/199.2 |
| 2013/0335819 A1 * | 12/2013 | Cooper | G02B 21/06 359/389 |

* cited by examiner

VARIABLE ORIENTATION ILLUMINATION-PATTERN ROTATOR

CROSS-REFERENCE TO RELATED APPLICATIONS

This application is a filing under 35 U.S.C. 371 of international application number PCT/US2011/058500, filed Oct. 31, 2011, published on Sep. 7, 2012 as WO 2012/118530, which claims priority to U.S. provisional patent application No. 61/447,708 filed Mar. 1, 2011; the disclosure of which is incorporated herein by reference in its entirety.

TECHNICAL FIELD

This disclosure relates to fluorescence microscopy and, in particular, to a system that changes the orientation of an interference fringe pattern used to illuminate a sample specimen.

BACKGROUND OF THE INVENTION

Three-dimensional structured illumination microscopy ("3D-SIM") achieves a factor of two improvement in lateral and axial resolution compared to conventional wide-field fluorescence microscopes used in cell biology. 3D-SIM requires no specialized fluorescent dyes or proteins, unlike certain competing super-resolution techniques. Biologists achieve high resolution with 3D-SIM, but retain convenient and familiar fluorescence labeling techniques. Multiple images of the subject are made with a shifting and rotating illumination pattern. Higher resolution is achieved by solving a system of equations to restore the fine spatial detail normally blurred by diffraction. A currently-available commercial 3D-SIM instrument uses a linearly polarized laser beam that is split into three or more beams by a binary phase grating. Each beam corresponds to a different diffraction order with most of the optical power concentrated in the first three diffraction orders ($0^{th}$ and $\pm 1^{st}$, respectively). The $0^{th}$ and $\pm 1^{st}$ order beams are focused onto the back focal plane of the microscope objective and combined to form a three-dimensional interference fringe pattern in the sample volume. 3D-SIM data are acquired by taking a fluorescence image excited by the fringe pattern, moving the grating a fifth of a period, approximately five micrometers, then taking another image, and repeating these steps for a total of five images. The grating is then rotated by 60 degrees, and the five image process is repeated, followed by another rotation and another five images, for a total of 15 images per z-step, where a z-step is a fixed point in the z-axis, coincident with the optical axis passing through the objective. Typically, at least eight z-steps are desired, for a total of 120 images per stack. These images are used to solve a system of linear equations to recover a 3D optically sectioned image with approximately double the resolution obtained by conventional wide-field microscopy. The image acquisition times involved are appreciable. Laser exposure may span 5-100 ms, camera readout may span about 50 ms per full-frame, grating motion and settlings may span tens of milliseconds, and rotation of the grating/polarization plate assembly may span roughly one full second; leading to a 3D-SIM stack acquisition time of 10-20 seconds. For the above described reasons, engineers, scientists, and microscope manufacturers continue to seek faster systems and methods for rotating the interferences pattern.

SUMMARY OF THE INVENTION

Variable orientation illumination-pattern rotators ("IPRs") that can be incorporated into structured illumination microscopy instruments to rapidly rotate an interference pattern are disclosed. An IPR includes a rotation selector and at least one mirror cluster. The rotation selector directs beams of light incident on the scanning mirror into each one of the mirror clusters for a brief period of time. Each mirror cluster imparts a particular angle of rotation on the beams. As a result, the beams output from the IPR are rotated through each of the rotation angles imparted by each of the mirror clusters. The rotation selector enables the IPR to rotate the beams through each rotation angle on the order of 5 milliseconds or faster, which is considerably faster than the conventional technique of rotating the grating/polarization plate.

DETAILED DESCRIPTION OF THE INVENTION

In structured illumination microscopy ("SIM"), an interference pattern is projected onto a sample and rotated. In order to generate a high-contrast interference pattern, the polarization of the beams forming the interference pattern are also rotated to match the rotation angle of the interference pattern. Variable orientation illumination-pattern rotators ("IPRs") that can be used to rapidly rotate an interference pattern and rotate the polarization to match the rotation angle of the interference pattern are disclosed.

Figure 1:
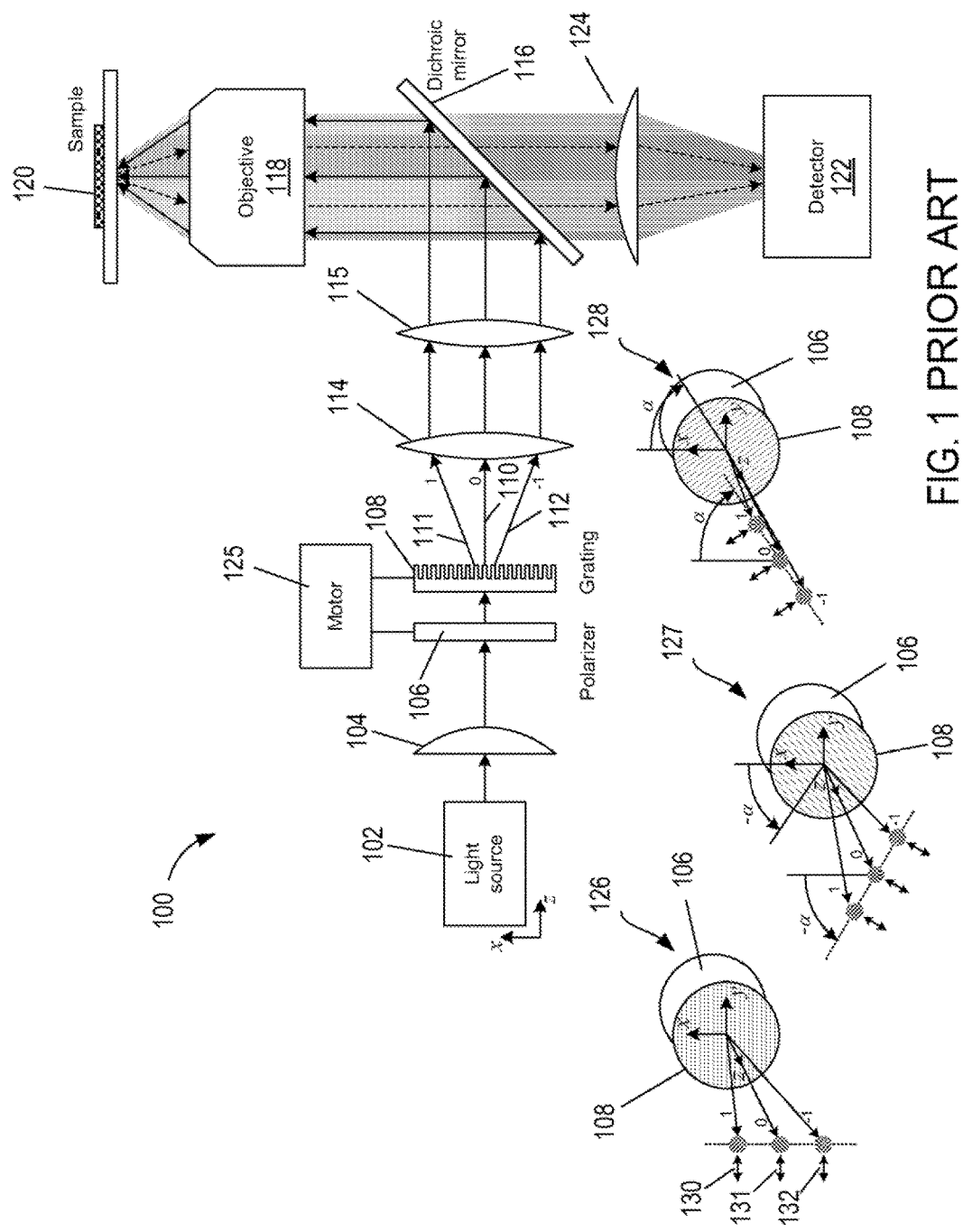
FIG. 1 shows a schematic representation of a conventional structured illumination microscopy instrument.

FIG. 1 shows a schematic representation of a conventional SIM instrument 100. Coherent light is output from a light source 102, such as a laser, and transmitted through a lens 104 and a polarization plate 106. The lens 104 collimates the light into a beam, and the polarization plate 106 passes only light of a particular polarization while blocking other polarizations. The polarized beam output from the polarization plate 106 passes through a one-dimensional, transmissive diffraction grading 108 that splits the light into three divergent, co-planar (i.e., xz-plane) coherent beams 110-112 referred to as the $0^{th}$, $+1^{st}$, and $-1^{St}$ order diffracted beams, respectively. The three beams 110-112 pass through a series of lenses, such as lenses 114 and 115, which orient the beams 110-112 so that the $+1^{st}$ and $-1^{st}$ order diffracted beams 111 and 112 are nearly parallel to the $0^{th}$ order diffracted beam 110. The beams 110-112 are reflected off of a dichroic mirror 116 to enter an objective 118. The beams 110-112 are focused at a focal plane of the objective 118 that lies within a sample 120 where the beams interfere with one another to generate a structured-illumination pattern within a volume of the sample 120.

Figure 2A:
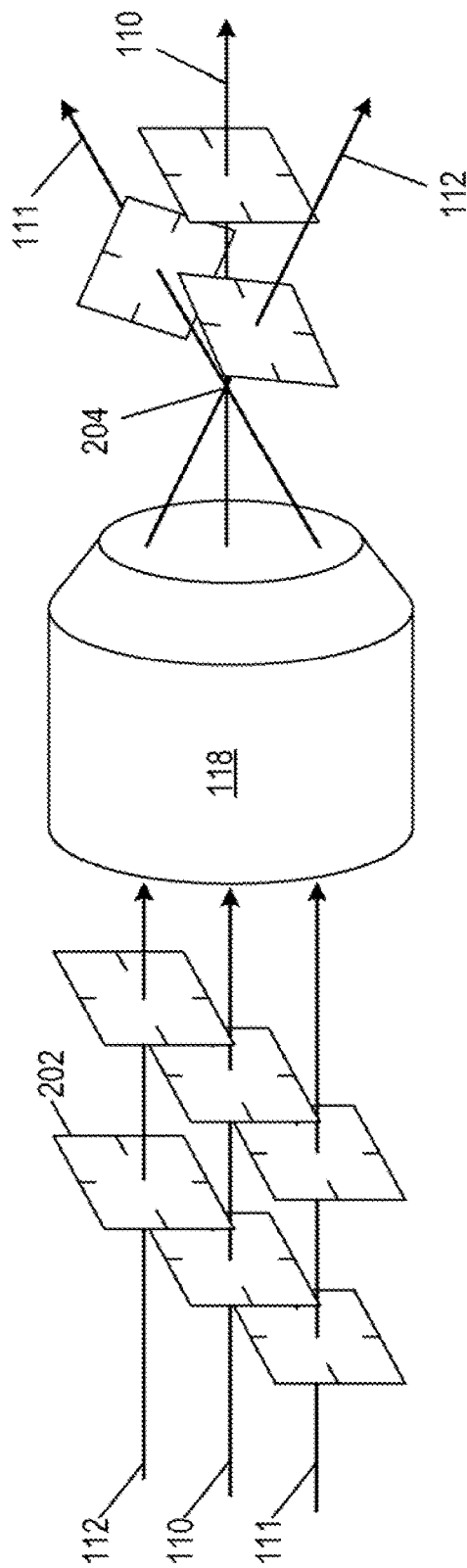
FIGS. 2A-2B show generation of a three-dimensional, structured-illumination pattern using three coherent beams.
Figure 2B:
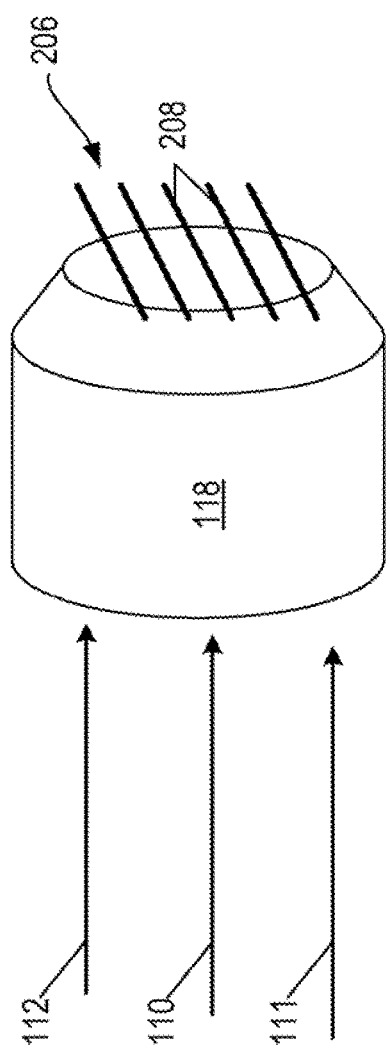

FIGS. 2A-2B show generation of a three-dimensional structured-illumination pattern using three coherent beams. As shown in FIG. 2A, the three coherent beams 110-112 are transmitted into the back of the objective 118. Because the beams 110-112 originate from a coherent light source 102, the beams 110-112 have plane waves in which the phases of component waves of the beams are identical across any plane, such as plane 202, normal to the beam direction. While the three beams 110-112 are coherent, each beam may have a different phase displacement than the other two beams. Focusing of the incident beams by the objective 118 to a focal point 204 changes the direction of the two non-axial beams 111 and 112, as shown in FIG. 2A. As a result, the three plane waves are no longer parallel with wave vectors k having different directions and the three sets of plane waves intersect to form a grid-like pattern of bright lines, due to constructive interference, surrounded by dark regions, due to destructive interference. In other words, as shown in the example of FIG. 2B, a stationary interference pattern 206 is located in the focal plane of the objective 118. Lines 208 represent bright lines separated by darker regions of the interference pattern 206.

Returning to FIG. 1, the lattice of light comprising the interference pattern causes fluorescent emission of light from fluorophores in the sample 120. The objective 118 captures, collimates and directs a portion of the fluorescent to the dichroic mirror 116. The fluorescent light passes through dichroic mirror 116 and is focused onto a photosensitive detector 122, such as a photomultiplier, photodiode, or a solid-state charged coupled device ("CCD"), by a lens 124.

In conventional SIM, the orientation of the interference pattern 206 can be determined by physically rotating the grating 108. The polarization is also rotated to match the orientation of the grating 108, which can be accomplished by also physically rotating the polarization plate 106. In the example of FIG. 1, the grating 108 and polarization plate 106 are connected to a motor 125 that physically rotates the grating 108 and the polarization plate 106 through a desired angle about the central $0^{th}$ order diffracted beam axis (i.e., z-axis). FIG. 1 also includes isometric views 126-128 of the grating 108 and polarization plate 106 to illustrate three different rotational orientations. In views 126-128, directional arrows, such as direction arrows 130-132 in the view 126, represent the electric field component, or polarization direction, selected by the polarization plate 106. In view 126, the grating 108 and polarization plate 106 are oriented so that the beams 110-112 lie within the xz-plane and the polarization associated with each beam is parallel to the x-axis. In view 127, the grating 108 and the polarization plate 106 are rotated through an angle -α about the central $0^{th}$ order diffracted beam axis (i.e., z-axis). As a result, the beams 111 and 112 are rotated through the angle -α about the $0^{th}$ order diffracted beam axis and the polarizing plate 106 selects the polarization component of the beams that approximately matches the angle -α. In view 128, the grating 108 and the polarization plate 106 are rotated through an angle +α about the central $0^{th}$ order beam axis (i.e., z-axis). As a result, the beams 111 and 112 are rotated through the angle +α about the $0^{th}$ order diffracted beam axis and polarizing plate 106 selects the polarization component of the beams that approximately matches the angle +α.

Although rotating the grating 108 and the polarization plate 106 is an effective technique for rotating an interference pattern in the sample 120, the operation described above is slow with switching times on the order of tens of milliseconds or longer. Various embodiments now described are directed to illumination-pattern rotators ("IPR") that can be incorporated into SIM instruments in order to rotate interference patterns on the order of 5 milliseconds or faster. Because the IPR is implemented with flat mirrors to determine the rotation angle of the interference pattern, the IPR also rotates the polarization to match the angle through which the interference pattern is rotated, thereby eliminating the need for additional polarization plates.

Figure 3:
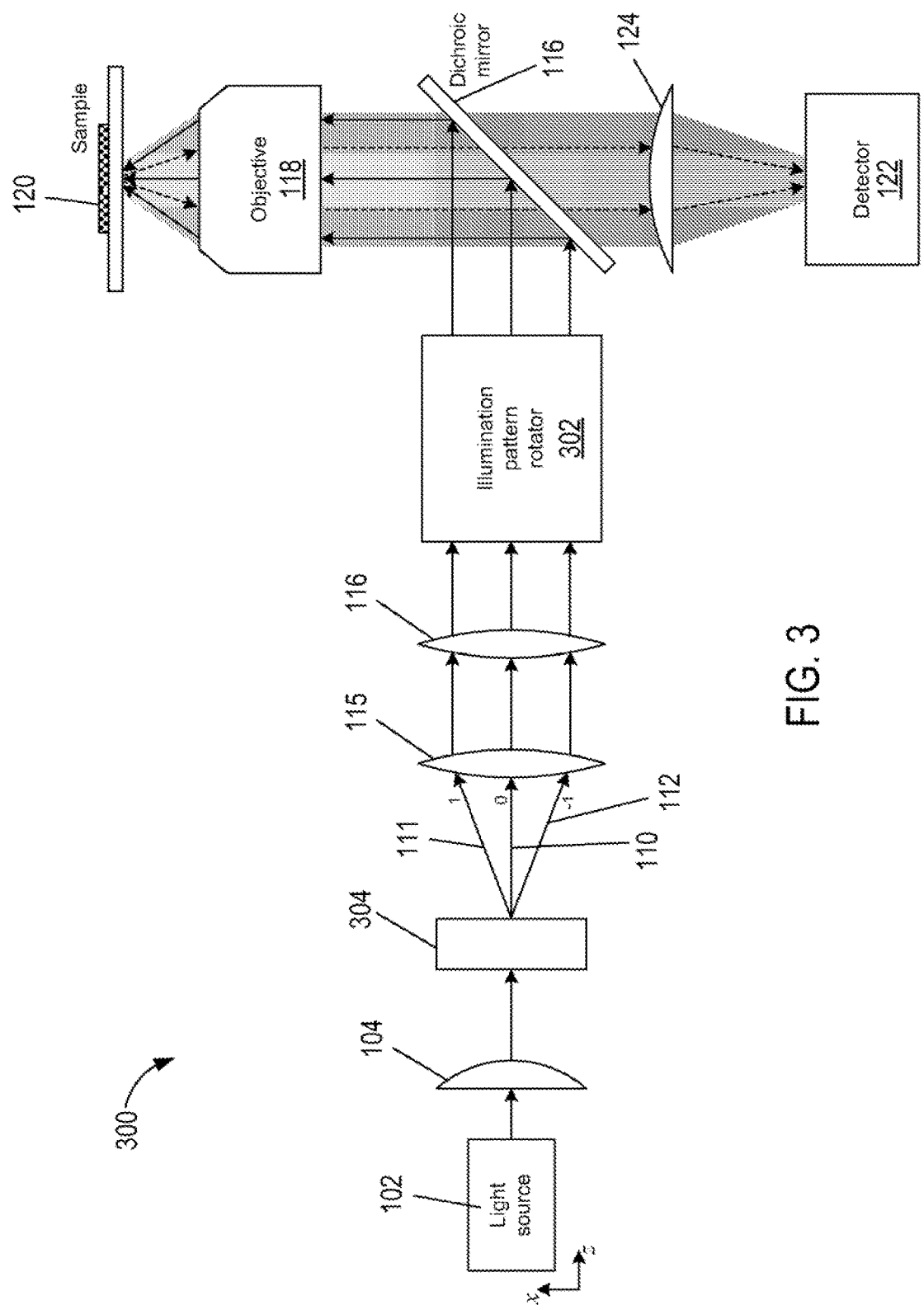
FIG. 3 shows an example structured illumination microscopy instrument.

FIG. 3 shows an example of a SIM instrument 300. The instrument 300 is similar to the conventional SIM instrument 100 described above except an IPR 302 is located in the path of the beams 110-112 between the lens 116 and the dichroic mirror 116 and the motor 125, polarization plate 106 and grating 108 of the instrument 100 are replaced by a splitter 304. The IPR 302 is not limited to being located between the lens 116 and the dichroic mirror 116. In practice, the IPR 302 can be located anywhere between the splitter 304 and the dichroic mirror 116. The splitter 304 can be any one of a variety of different types of transmissive gratings. For example, the splitter 304 can be a one-dimensional transmissive grating composed of a transparent plate of glass with a series of substantially parallel grooves formed in one surface of the grating or the splitter 304 can be an opaque plate with a series of substantially parallel thin slits. Alternative, the splitter 304 can be replaced with a two-dimensional, transmissive grating to create a different interference pattern in the focal plane of the sample 120. For example, the splitter 304 can be a transparent plate with a grid of grooves formed in one surface of the plate or the splitter 304 can be an opaque plate with an array of tiny apertures. Alternatively, the splitter 304 can be one or more beamsplitters arranged to split the beam of light output from the lens 104 into two or more separate coherent beams. In the example of FIG. 3, the polarization plate 106 is omitted because the light output 102 can be configured to output polarized light.

There are many different types of SIM instruments and corresponding optical paths. Instrument 300 is not intended to represent the optical paths within all the different, well-known variations of instruments used in SIM microscopy, but is instead intended to illustrate the general principals of a SIM that includes an IPR. One alternative configuration for an SIM instrument similar to the instrument 300 is to replace the dichroic mirror 116 with a dichroic mirror that transmits the beams 110-112 and reflects the fluorescent beam collected and collimated by the objective 118. In this alternative embodiment, the location of the lens 124 and detector 122 is switched with the IPR 302, lenses 115 and 116, splitter 304, lens 204, and light source 102.

Figure 4A:
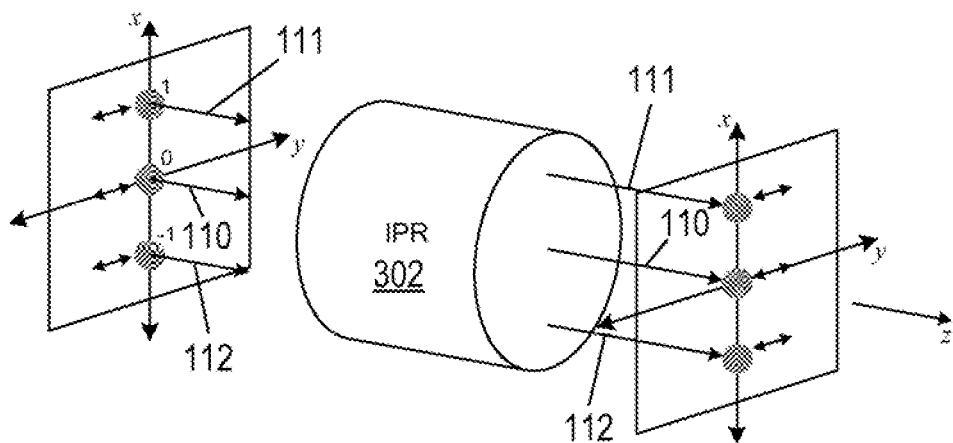
FIGS. 4A-4C show an illumination-pattern rotator that rotates three separate beams of light.
Figure 4B:
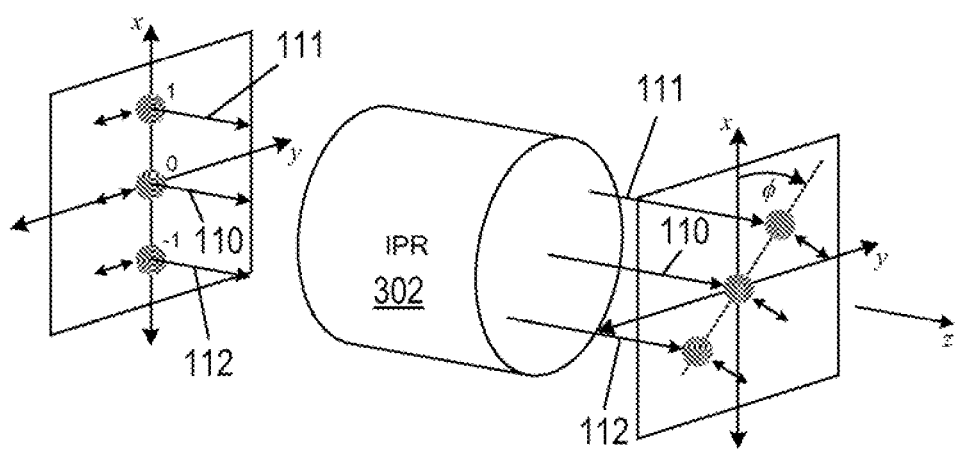
Figure 4C:
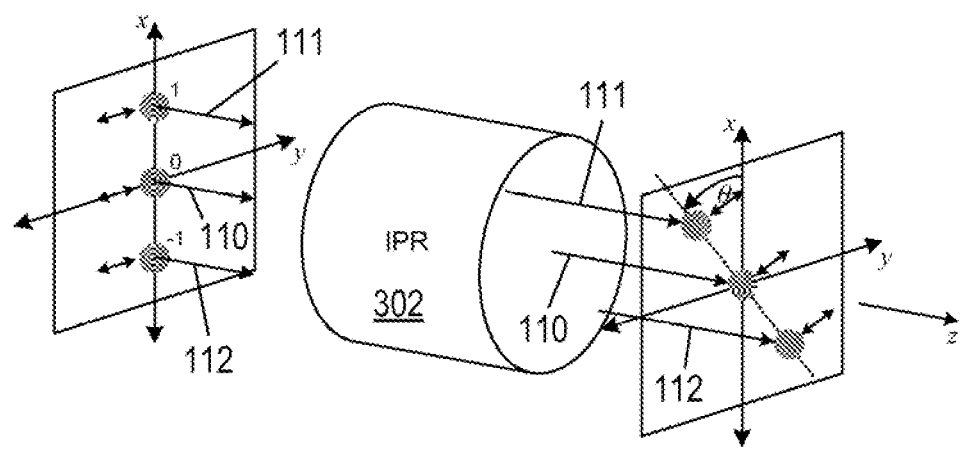

FIGS. 4A-4C show how the IPR 302 rotates the beams 110-112 and polarization associated with each of the beams. In FIG. 4A, the IPR 302 preserves the orientation of the beams 110-112 so that the beams 110-112 travel in the xz-plane with the polarization associated with each beam oriented parallel to the x-axis. In FIG. 4B, the IPR 302 rotates the beams 110-112 through an angle φ about the central $0^{th}$ order diffracted beam axis (i.e., z-axis) and rotates the polarization associated with each beam through the same angle. In FIG. 4C, the IPR 302 rotates the beams 110-112 through an angle θ about the central $0^{th}$ order diffracted beam axis and rotates the polarization associated with each beam through the same angle.

Figure 5:
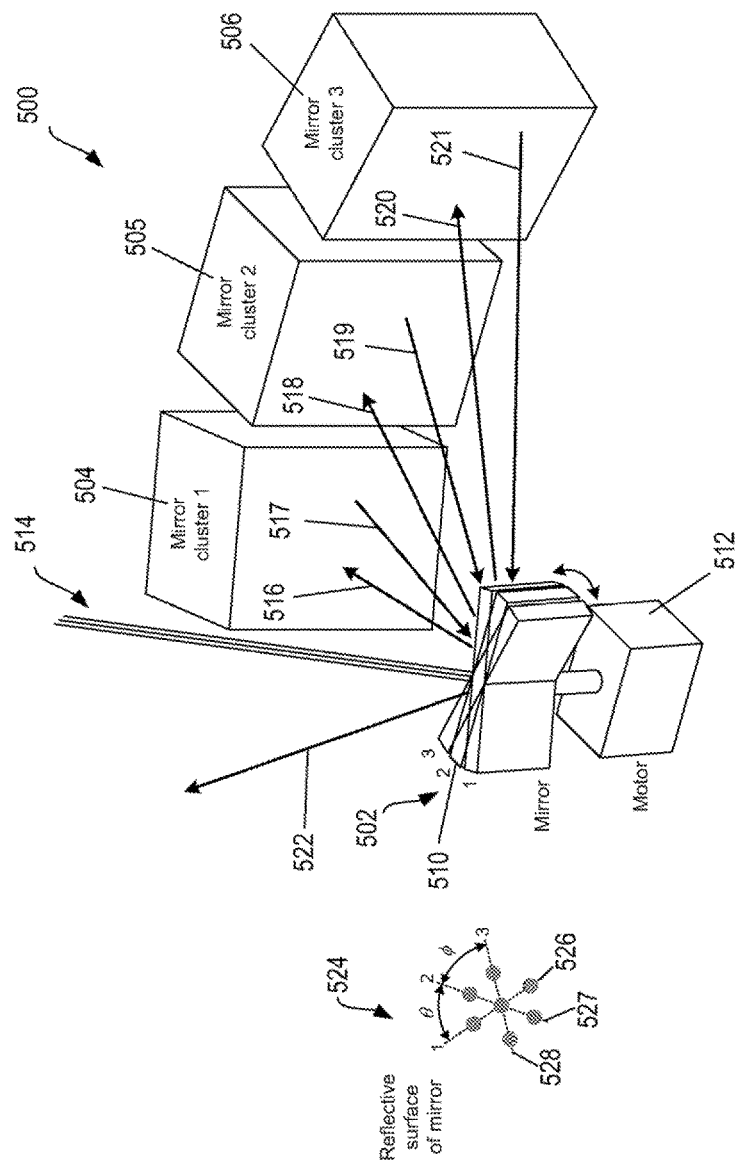
FIG. 5 shows an isometric view of an example illumination-pattern rotator.

FIG. 5 shows an isometric view of an example IPR 500. The IPR 500 includes a scanning mirror 502 and three separate mirror clusters 504-506. FIG. 5 shows an example of scanning mirror 502 that includes a flat mirror 510 attached to a rotatable shaft of a motor 512. The motor 512 can be galvanometer, in which case the scanning mirror 502 is a galvanometer mirror, or the motor 512 can be a stepper motor that divides rotation of the mirror 510 into a series of rotational steps or any other kind of motor that imparts precise rotation of the mirror 510. Alternatively, the scanning mirror can be a piezoelectric controlled mirror. As shown in FIG. 5, the reflective surface of the mirror 510 is rotated using the motor 512 to in turn face each of the mirror clusters 504-506. Three parallel lines 514 represent the $0^{th}$ and $\pm 1^{st}$ order diffracted beams output from a grating, such as the splitter 304 described above. As shown in FIG. 5, three rotational positions 1, 2 and 3 of the mirror 510 are identified. Positions 1, 2 and 3 correspond to particular rotational positions of the mirror 510 with respect to mirror clusters 1, 2 and 3. Each of the mirror clusters imparts a different angle of rotation to the beams 514 and matching angle of rotation in the polarization associated with the beams. The IPR 500 is operated as follows. When the mirror 510 is rotated into position 1, the beams 514 are reflected off of the mirror 510 toward mirror cluster 1 504 as represented by directional arrow 516. Mirror cluster 1 504 rotates the beams and associated beam polarizations through a first rotational angle and reflects the beams back to the mirror 510 as represented by directional arrow 517. When the mirror 510 is rotated into position 2, the beams 514 are reflected off of the mirror 510 toward mirror cluster 2 505 as represented by directional arrow 518. Mirror cluster 2 505 rotates the beams through a second rotational angle and reflects the beams back to the mirror 510 as represented by directional arrow 519. When the mirror 510 is rotated into position 3, the beams 514 are reflected off of the mirror 510 toward mirror cluster 3 506 as represented by directional arrow 520. Mirror cluster 3 506 rotates the beams through a third rotational angle and reflects the beams back to the mirror 510 as represented by directional arrow 521. Directional arrow 522 represents the rotated beams reflected off of the mirror 510. FIG. 5 includes a view 524 of the reflective surface of the mirror 510 that represents co-alignment of the rotated beams reflected off of the surface of the mirror 510. Dashed lines 526-528 represent the three different rotations imparted on the three beams by the mirror clusters 504-506 as viewed from the reflective surface of the mirror 510. Dashed line 526 represents the orientation of the beams produced by mirror cluster 1 504, dashed line 527 represents the orientation of the beams produced by mirror cluster 2 505, and dashed line 528 represents the orientation of the beams produced by mirror cluster 3 506. In alternative embodiments, the IPR 500, and other IPRs described below, may include an exit path mirror located in the path of the beam 522 to provide additional control over the direction in which the beams are output from the IPR 500.

Figure 6A:
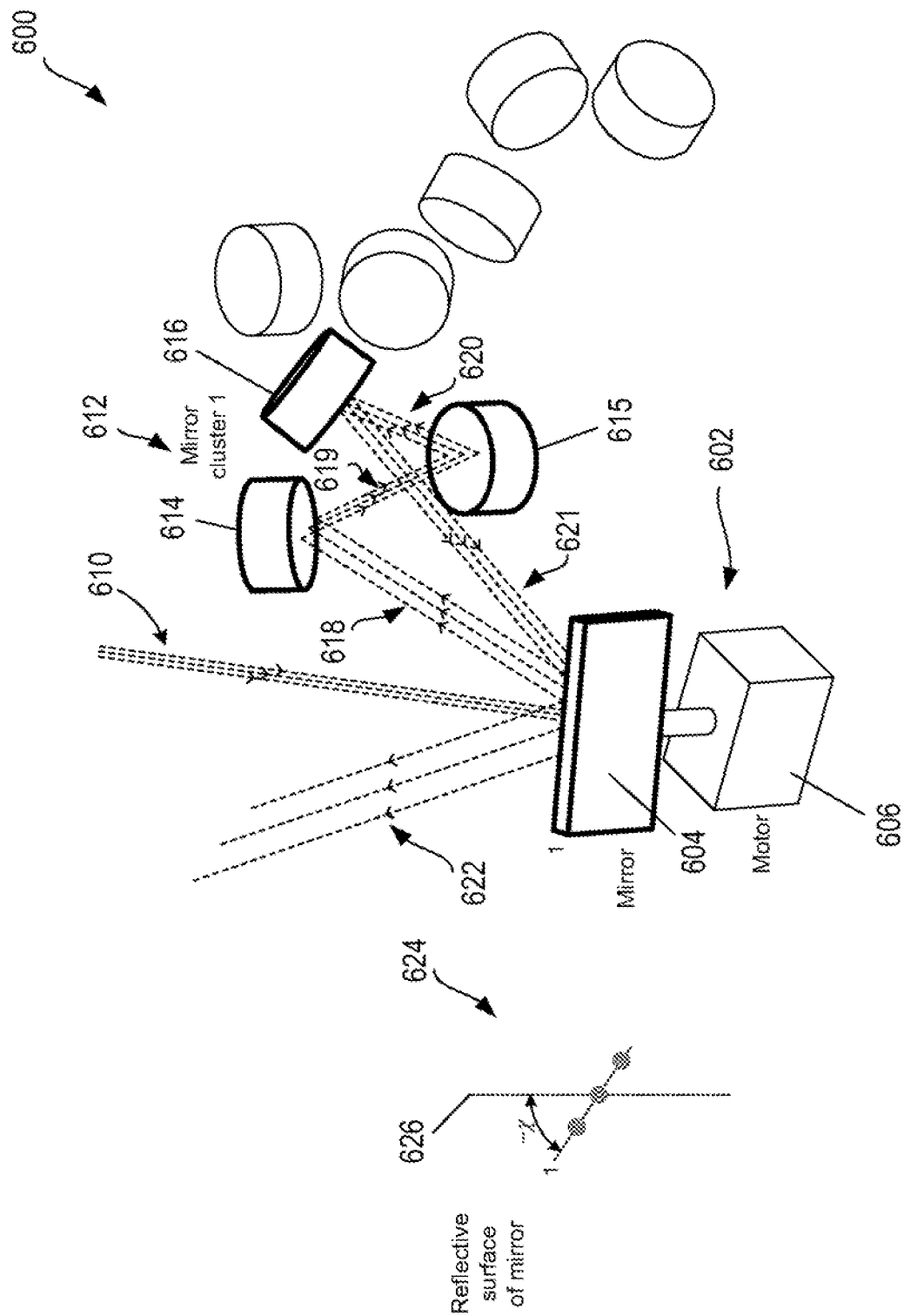
FIGS. 6A-6C show an isometric view of a particular arrangement of mirror clusters associated with an example illumination-pattern rotator.
Figure 6B:
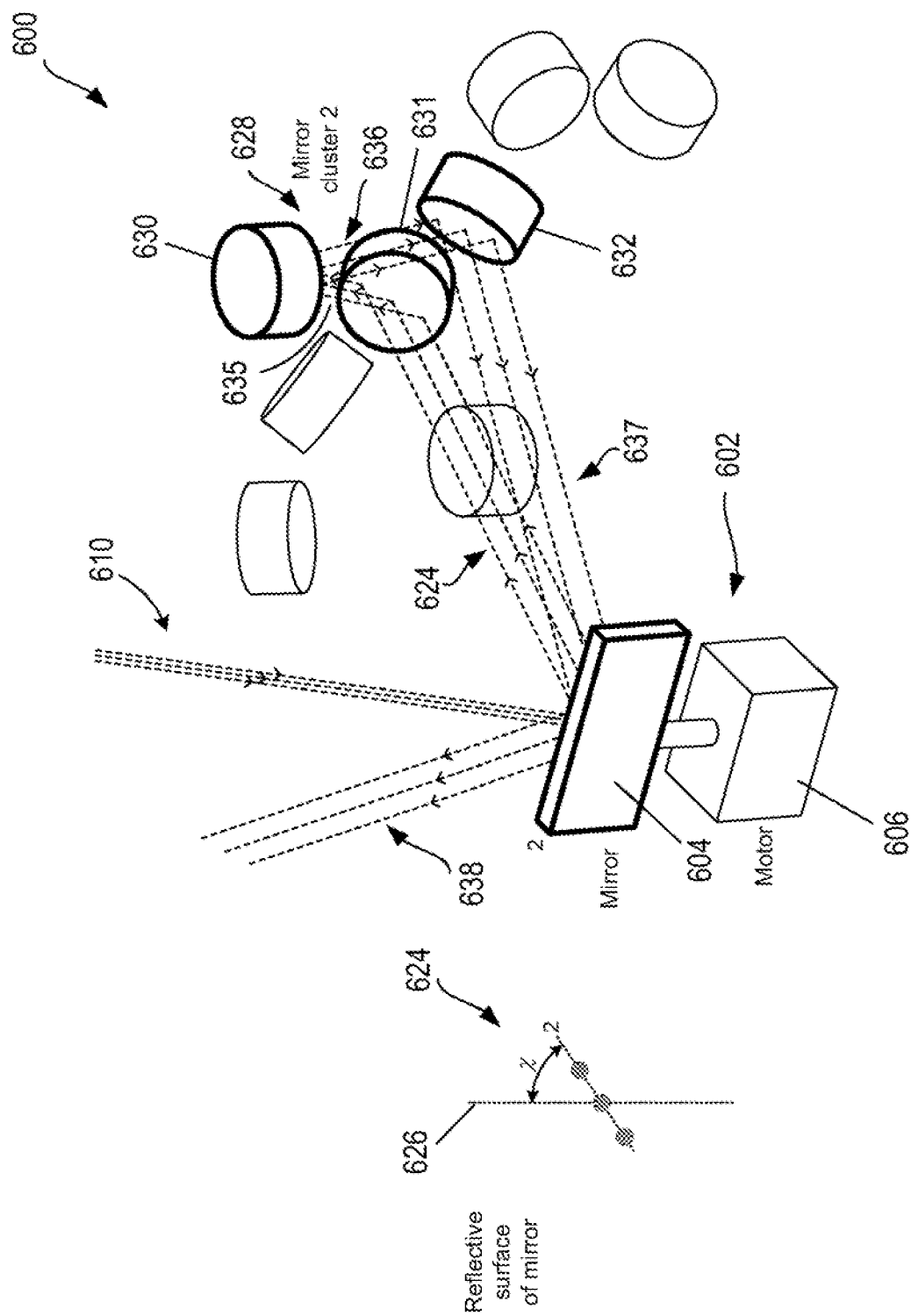
Figure 6C:
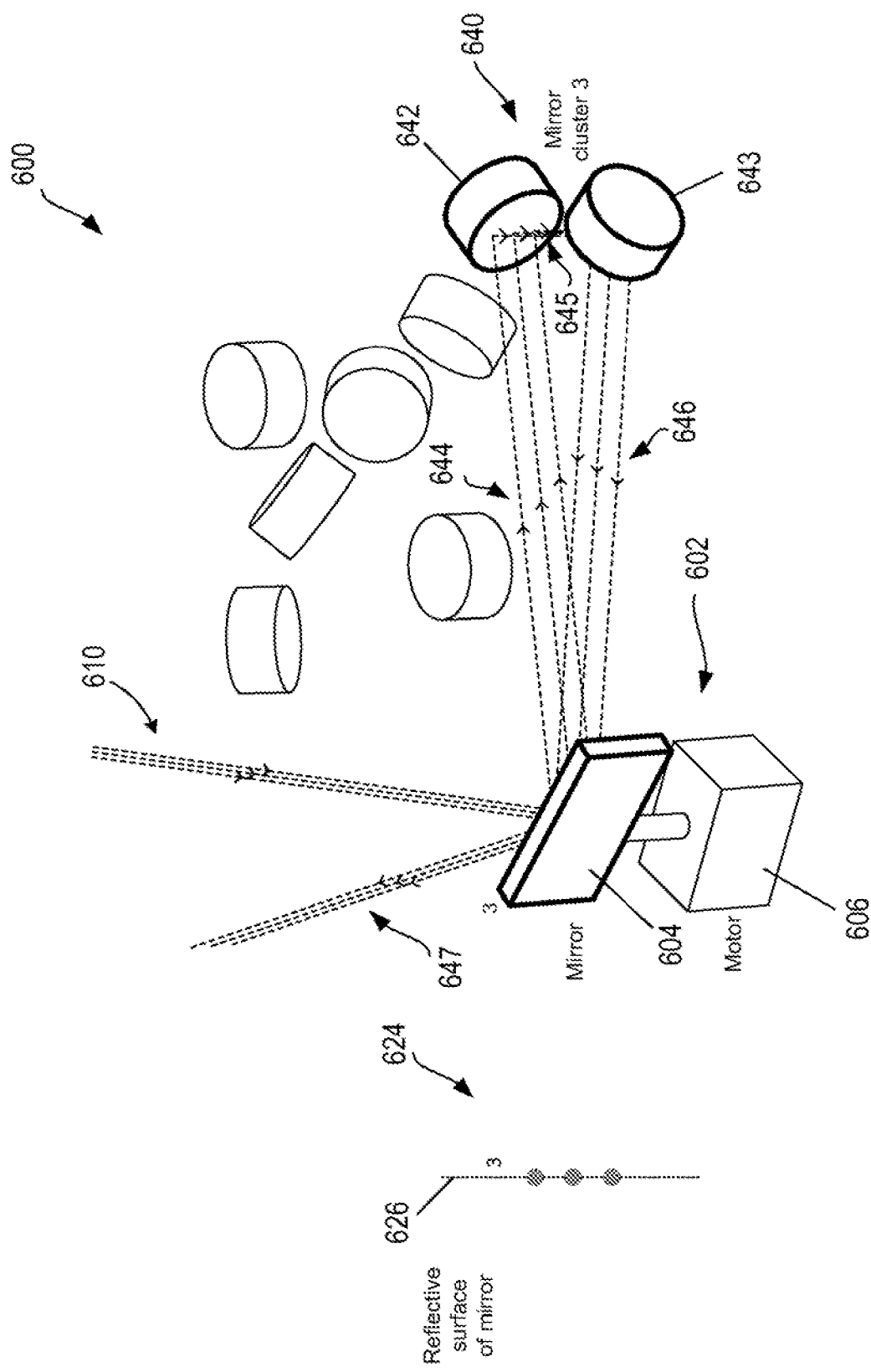

FIGS. 6A-6C show an isometric view of a particular arrangement of mirror clusters associated with an example IPR 600. The IPR 600 is similar to the IPR 500 in that the IPR 600 includes a scanning mirror 602 composed of a flat mirror 604 attached to a rotatable shaft of a motor 606. The IPR 600 includes three separate mirror clusters 1, 2 and 3 that are each described separately with reference to FIGS. 6A, 6B, and 6C, respectively. In FIGS. 6A-6C, dashed lines 610 represent the $0^{th}$ and $\pm 1^{st}$ order diffracted beams output from a grating, such as the splitter 304 described above. In FIG. 6A, a mirror cluster 1 612 is composed of three flat mirrors 614-616 positioned and oriented in three-dimensional space. Sets of dashed lines 618-622 represent the paths the three beams travel as the beams are reflected off of the mirror 604, the cluster of mirrors 614-616 and again off of the mirror 604. A view 624 of the reflective surface of the mirror 604 reveals that the cluster of mirrors 612 rotates the three beams through an angle of $-\chi$ with respect to an axis 626. In FIG. 6B, a mirror cluster 2 628 is composed of three flat mirrors 630-632 that are also positioned and oriented in three-dimensional space. Sets of dashed lines 634-638 represent the paths the three beams travel as the beams are reflected off of the mirror 604, the cluster of mirrors 630-623 and again off of the mirror 604. The view 624 of the reflective surface of the mirror 604 reveals that the reflections off of the cluster of mirrors 628 rotates the three beams through an angle of $\chi$ with respect to the axis 626. In FIG. 6C, a mirror cluster 3 640 is composed of two flat mirrors 642 and 643 positioned and oriented in three-dimensional space. Sets of dashed lines 644-647 represent the paths the three beams travel as the beams are reflected off of the mirror 604, the cluster of mirrors 642 and 643 and again off of the mirror 604. The view 624 of the reflective surface of the mirror 604 reveals that the cluster of mirrors 649 aligns the three beams with the axis 626.

In the example represented in FIGS. 6A-6C, the input beams 610 can be aligned with the axis 626. The mirrors comprising mirror cluster 640 can be oriented so that the angle of the beams reflected off of the exit path mirror 608 substantially matches the angle of the input beams 610 and the mirrors comprising mirror clusters 612 and 628 can be oriented so that $\chi \sim 60°$. Also, the number of mirrors used to form a cluster of mirrors is not limited to two or three mirrors. Depending on the desired angle of rotation, any suitable number of mirrors appropriately positioned and oriented in two- or three-dimensional space can be used to form a mirror cluster to impart a desired angle of rotation on the beams.

Figure 7:
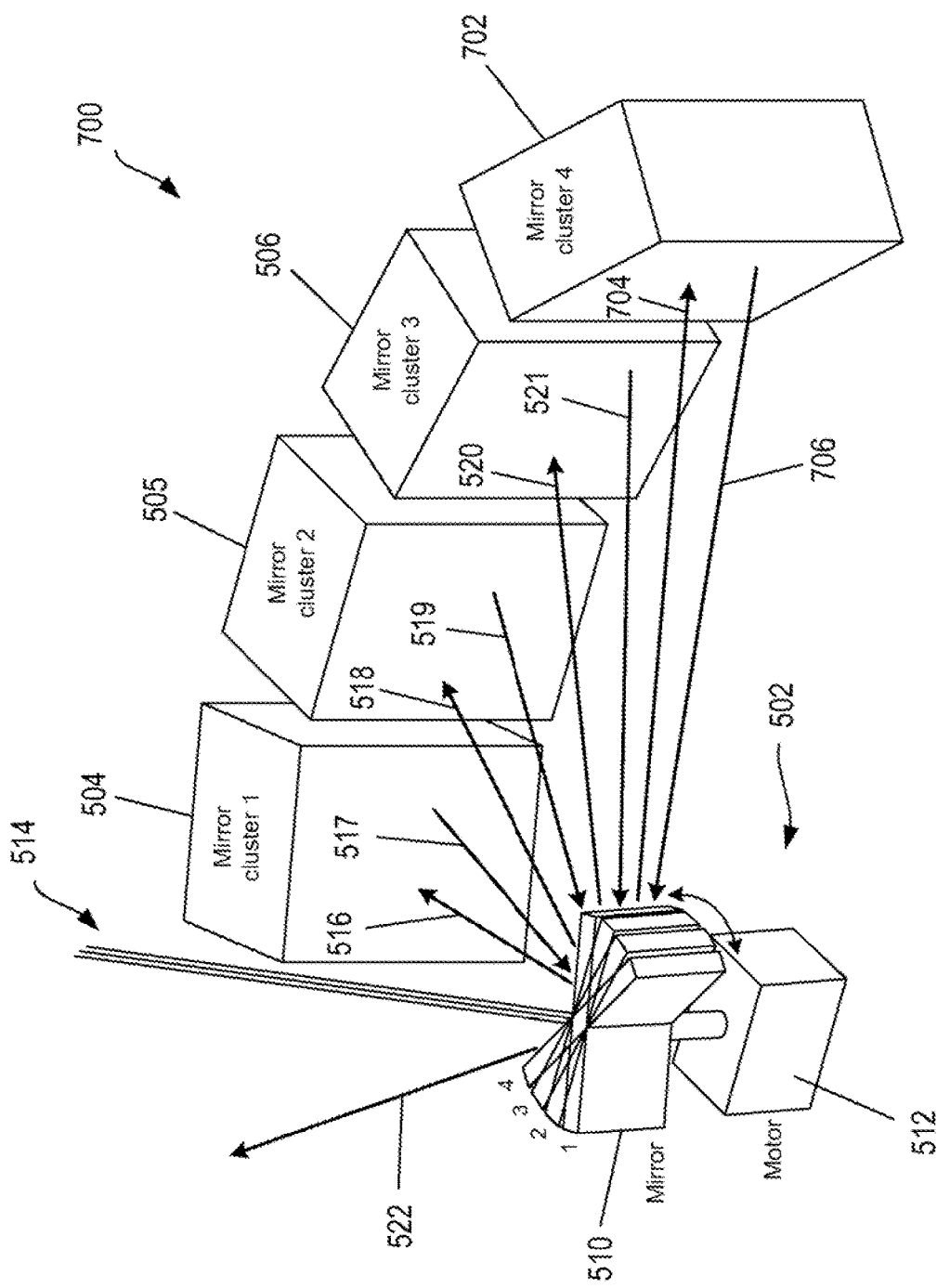
FIG. 7 shows an isometric view of an example illumination-pattern rotator.

IPRs are not intended to be limited to having only three mirror clusters to orient the interference pattern. Alternatively, an IPR can have as few as one mirror cluster or as many as four or more mirror clusters. FIG. 7 shows an isometric view of an example IPR 700. The IPR 700 is similar to the IPR 500 except the IPR 700 includes an additional mirror cluster 4 702. In the example of FIG. 7, four rotational positions 1, 2, 3 and 4 of the mirror 510 are identified. Positions 1, 2, 3 and 4 correspond to particular rotational positions of the mirror 510 with respect to mirror clusters 1, 2, 3 and 4 with each of the mirror clusters 504-506 imparting a different rotation to the beams 514 and polarization to match the rotation of the beams, as described above with reference to FIG. 5. Mirror cluster 4 702 also imparts a rotation on the beams that is different from the rotations imparted by the mirror clusters 504-506. When the mirror 510 is rotated into position 4, the beams 514 are reflected off of the mirror 510 toward mirror cluster 4 702 as represented by directional arrow 704. Mirror cluster 4 702 rotates the beams and associated beam polarizations through a fourth rotational angle and reflects the beams back to the mirror 510 as represented by directional arrow 706. The beams are then reflected off of the mirror 510 as described above with reference to FIG. 5.

Figure 8A:
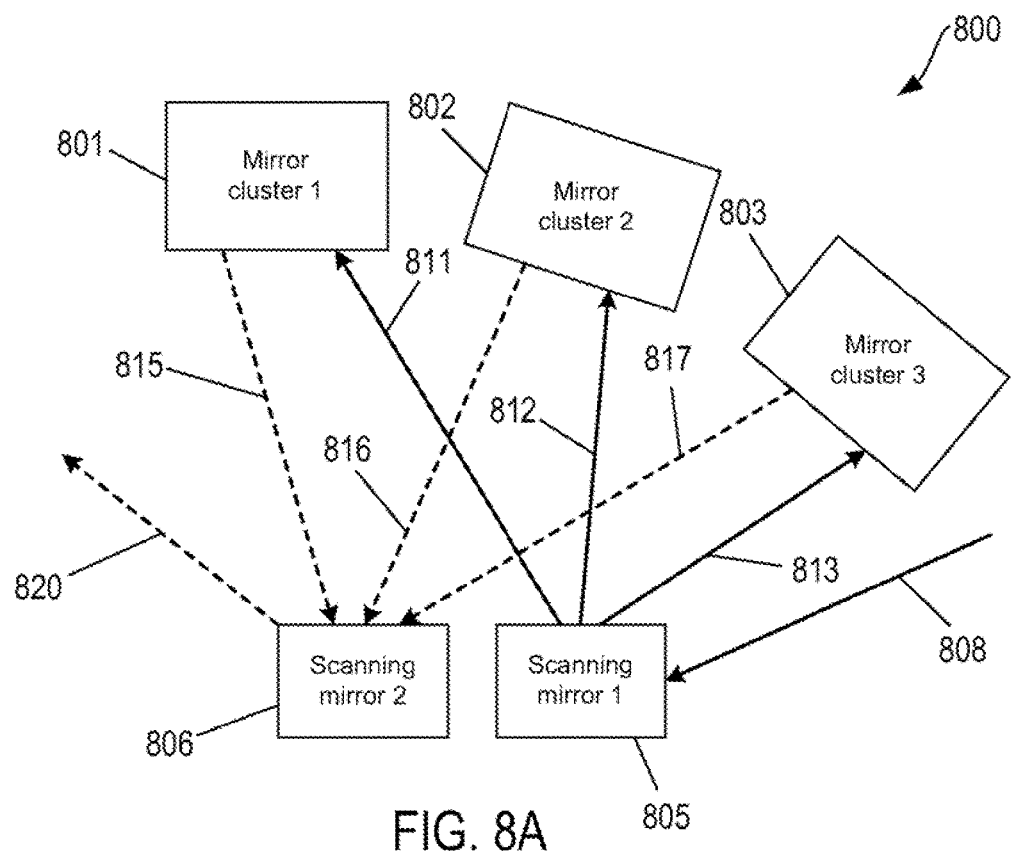
FIGS. 8A-8C show schematic representations of three examples of illumination-pattern rotators.
Figure 8B:
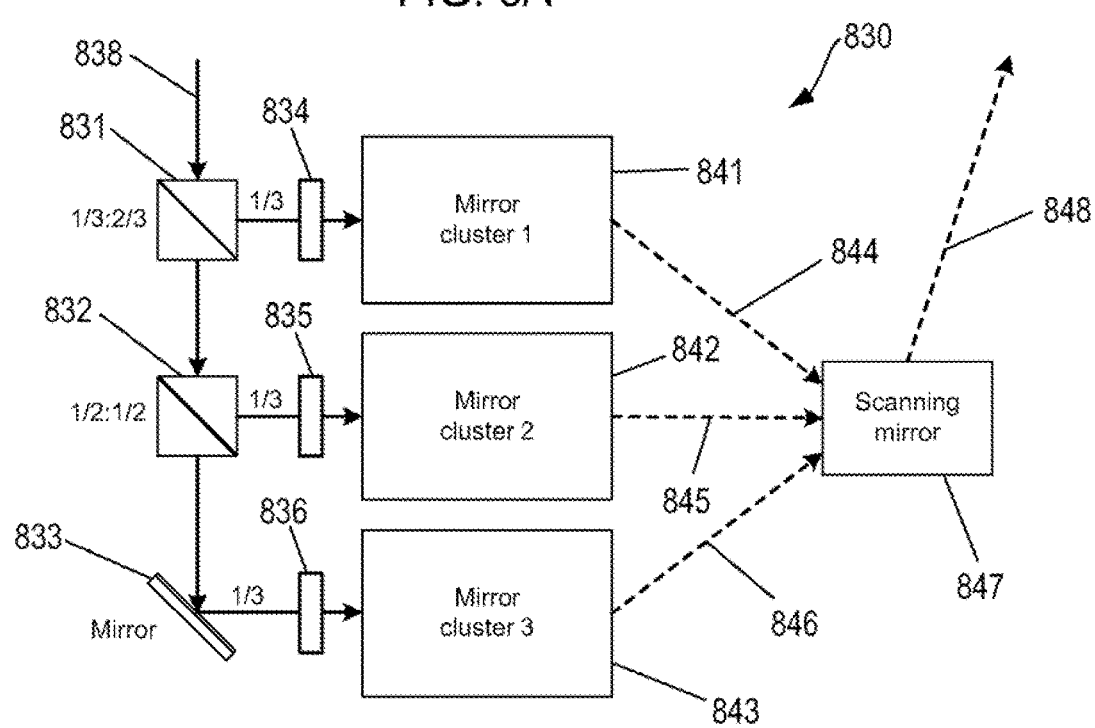
Figure 8C:
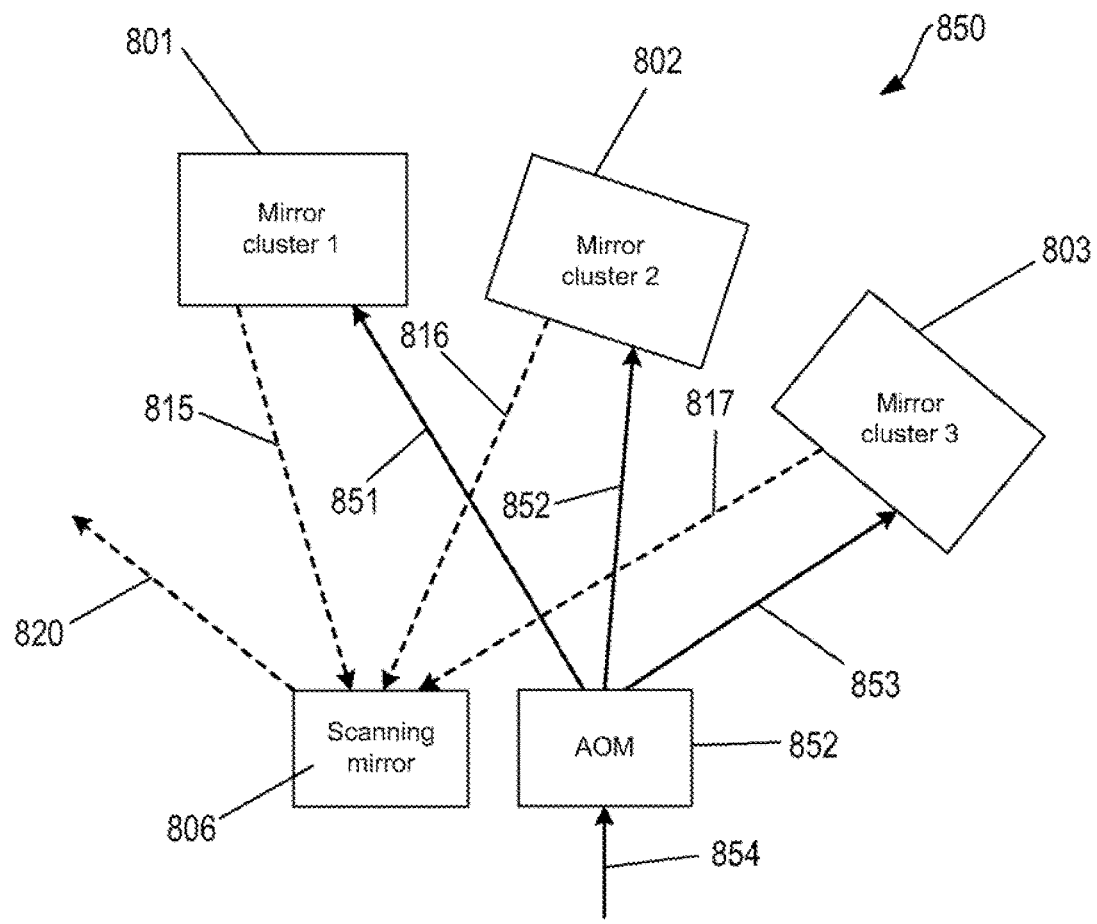

FIGS. 8A-8C show schematic representations of three examples of alternative implementations of IPRs. In FIG. 8A, an IPR 800 includes three mirror clusters 801-803 and two scanning mirrors 805 and 806. Directional arrow 808 represents the path beams of light travel along to the first scanning mirror 805. Directional arrows 811-813 represent three separate paths along which the first scanning mirror 805 directs the beams to each of the mirror clusters 801-803. The mirror clusters 801-803 each include two or more flat mirrors that are arranged in three-dimensional space to impart a particular angle of rotation on the beams as described above. Directional arrows 815-817 represent the separate paths each of the mirror clusters 801-803 reflect the rotated beams along to the second scanning mirror 806. The second scanning mirror 806 reflects the rotated beams out of the IPR 800 along the same path represented by directional arrow 820. The scanning mirrors 805 and 806 are timed as follows. When the first scanning mirror 805 reflects the beams 808 toward the mirror cluster 801, the second scanning mirror 806 reflects the rotated beams 815 out of the IPR 800 along the path 820. When the first scanning mirror 805 reflects the beams 808 toward the mirror cluster 802, the second scanning mirror 806 reflects the rotated beams 816 out of the IPR 800 along the path 820. When the first scanning mirror 805 reflects the beams 808 toward the mirror cluster 803, the second scanning mirror 806 reflects the rotated beams 817 out of the IPR 800 along the path 820.

Note that the scanning mirrors 502, 602, and 805 are examples of rotation selectors in that the scanning mirrors are operated to direct the beams to one of the mirror clusters in which a particular predetermined angle of rotation is imparted to the beams. However, IPR embodiments are not intended to be limited to a particular type of rotation selector. FIGS. 8B and 8C represent examples of two other typed of rotation selectors.

In FIG. 8B, IPR 830 includes a 1/3:2/3 beamsplitter 831, 1/2:1/2 beamsplitter 832, a mirror 833 and three shutters 834-836. Directional arrow 832 represents the path beams of light travel along to the beamsplitter 831. The beamsplitter 831 reflects approximately ⅓ of the optical power to the shutter 834 and transmits approximately ⅔ of the optical power to the beamsplitter 832, which reflects approximately ½ of the optical power to the shutter 835 and a transmits approximately ½ of the optical power to the mirror 833. As a result, each of the shutters 834-836 receives the beams of light with approximately ⅓ of the optical power. Mirror clusters 841-843 each include two or more flat mirrors that are arranged in three-dimensional space to impart a particular angle of rotation on the beams that pass through the shutters as represented by directional arrows 844-846. Only one of the shutters is open at a time and opening of the shutters is timed with operation of scanning mirror 847 as follows. When the shutter 834 is open the scanning mirror 847 reflects the rotated beams 844 out of the IPR 830 along path 848. When the shutter 835 is open the scanning mirror 847 reflects the rotated beams 845 out of the IPR 830 along the path 848. When the shutter 836 is open the scanning mirror 847 reflects the rotated beams 846 out of the IPR 830 along the path 848. In FIG. 8C, IPR 850 is similar to the IPR 800 except the first scanning mirror 805 is replaced with an acousto-optic modulator ("AOM") 852. Directional arrow 854 represents the path beams of light travel along to the AOM 852. Directional arrows 853-854 represent the three separate paths along which diffracted beams travel to the mirror clusters 801-803. Which diffracted path the beams travel along to one of the mirror clusters is determined by the intensity of sound generated within the AOM 852 which is timed with the operation of the scanning mirror 806 as described above.

Note that the beamsplitter/shutter and AOM are intended to be implemented in combination with a scanning mirror, as described above with reference to FIGS. 8B and 8C, in order to ensure that the rotated beams travel along the same path out of the IPRs 830 and 850.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the following claims and their equivalents.

What is claimed is:

1. An illumination-pattern rotator for selective rotation of at least one input beam of light comprising:
   a rotation selector; and
   one or more mirror clusters,
   wherein the rotation selector is arranged such that one or more beams of light from a light source that are linearly polarized strike the rotation selector and undergo a first reflection that directs the one or more beams of light towards the one or more mirror clusters,
   wherein the one or more mirror clusters are arranged to receive the first reflected one or more beams of light, rotate a linear polarization of the first reflected one or more beams of light by at least one of a plurality of different predefined angles about an axis directed in a propagation direction of the first reflected one or more beams of light, and reflect the one or more rotated beams of light away from the one or more mirror clusters, and
   wherein the rotation selector is operable to select an angle by which to rotate a linear polarization of light.

2. The illumination-pattern rotator of claim 1, wherein the rotation selector comprises a scanning mirror.

3. The illumination-pattern rotator of claim 1, wherein each of the one or more mirror clusters comprises two or more flat mirrors.

4. The illumination-pattern rotator of claim 1, wherein each of the one or more mirror clusters comprises two or more mirrors positioned and oriented in three-dimensional space.

5. The illumination-pattern rotator of claim 1, wherein each of the one or more mirror clusters comprises two or more mirrors positioned and oriented such that the one or more rotated beams of light are reflected back to the rotation selector.

6. The illumination-pattern rotator of claim 1, wherein each of the one or more mirror clusters is arranged to rotate a linear polarization of the first reflected one or more beams of light to match an angle through which each of the one or more mirror clusters rotates the linear polarization of the first reflected one or more beams of light.

7. The illumination-pattern rotator of claim 1, wherein the rotated one or more beams of light are reflected back to the rotation selector, strike the rotation selector, and undergo a second reflection that directs the rotated one or more beams of light-away from the one or more mirror clusters.

8. The illumination-pattern rotator of claim 1, further comprising a scanning mirror, and wherein the rotated one or more beams of light are reflected to the scanning mirror, strike the scanning mirror, and undergo a second reflection that directs the rotated one or more beams of light away from the one or more mirror clusters.

9. The illumination-pattern rotator of claim 1, wherein the rotation selector comprises one or more beam splitters, a mirror, and two or more shutters, wherein each of the one or more beam splitters is arranged to split the one or more beams of light from the light source, wherein the mirror is arranged to reflect the one or more beams of light from the light source towards a corresponding mirror cluster, and wherein each of the two or more shutters are located in a light path of the one or more beams of light reflected towards a mirror cluster.

10. The illumination-pattern rotator of claim 1, wherein the rotation selector is an acousto-optic modulator.

11. A structured illumination microscopy instrument comprising:
a splitter arranged to receive and split a coherent beam of light from a light source into three or more beams of light;
a rotation selector;
one or more mirror clusters; and
an objective,
wherein the rotation selector is arranged such that the three or more beams of light, which are linearly polarized, strike the rotation selector and undergo a first reflection that directs the three or more beams of light towards the one or more mirror clusters,
wherein the one or more mirror clusters are arranged to receive the first reflected three or more beams of light, rotate a linear polarization of the first reflected three or more beams of light by at least one of a plurality of different predefined angles about an axis directed in a propagation direction of the first reflected three or more beams of light, and reflect the three or more rotated beams of light away from the one or more mirror clusters,
wherein the objective is arranged to receive the three or more rotated beams of light and focus the three or more rotated beams of light to form an interference pattern in a focal plane, and
wherein the rotation selector is operable to select an angle by which to rotate a linear polarization of light.

12. The instrument of claim 11, wherein the splitter comprises a grating.

13. The instrument of claim 11, wherein each of the one or more mirror clusters comprises two or more mirrors positioned and oriented in three-dimensional space.

14. The instrument of claim 11, wherein each of the one or more mirror clusters comprises two or more mirrors positioned and oriented such that the three or more rotated beams of light are reflected back to the rotation selector.

15. The instrument of claim 11, wherein each of the one or more mirror clusters is arranged to rotate a linear polarization of the first reflected three or more beams of light to match an angle through which each of the one or more mirror clusters rotates the linear polarization of the first reflected three or more beams of light.

16. The instrument of claim 11, further comprising a scanning mirror, and wherein the three or more rotated beams of light—are reflected to the scanning mirror.

17. The instrument of claim 11, wherein the rotation selector further comprises a mirror and two or more shutters, wherein the mirror is arranged to reflect the three or more beams of light towards a corresponding mirror cluster, and wherein each of the two or more shutters are located in a light path of the three or more beams of light reflected towards a mirror cluster.

18. The instrument of claim 11, wherein the rotation selector is an acousto-optic modulator.

\* \* \* \* \*